United States Patent
Maruyama et al.

(10) Patent No.: US 11,415,698 B2
(45) Date of Patent: Aug. 16, 2022

(54) POINT GROUP DATA PROCESSING DEVICE, POINT GROUP DATA PROCESSING METHOD, POINT GROUP DATA PROCESSING PROGRAM, VEHICLE CONTROL DEVICE, AND VEHICLE

(71) Applicant: TOYOTA JIDOSHA KABUSHIKI KAISHA, Toyota (JP)

(72) Inventors: Shiro Maruyama, Tokyo (JP); Daisuke Okanohara, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 411 days.

(21) Appl. No.: 16/484,883

(22) PCT Filed: Feb. 15, 2018

(86) PCT No.: PCT/JP2018/005251
§ 371 (c)(1),
(2) Date: Aug. 9, 2019

(87) PCT Pub. No.: WO2018/151211
PCT Pub. Date: Aug. 23, 2018

(65) Prior Publication Data
US 2020/0057905 A1   Feb. 20, 2020

(30) Foreign Application Priority Data
Feb. 15, 2017   (JP) .............................. JP2017-025742

(51) Int. Cl.
*G01S 17/00*   (2020.01)
*G01S 17/931*   (2020.01)
(Continued)

(52) U.S. Cl.
CPC .......... *G01S 17/931* (2020.01); *B60W 40/04* (2013.01); *G01S 7/4802* (2013.01); *G01S 17/42* (2013.01);
(Continued)

(58) Field of Classification Search
CPC ...... G01S 17/931; G01S 7/4802; G01S 17/42; G01S 17/89; G01S 17/86; B60W 40/04;
(Continued)

(56) References Cited

U.S. PATENT DOCUMENTS

2016/0210735 A1   7/2016   Fukushima

FOREIGN PATENT DOCUMENTS

JP   2003-084064 A   3/2003
JP   2007-255978 A   10/2007
(Continued)

OTHER PUBLICATIONS

Yan et al, Automatic Extraction of Moving Objects from Image and LINDAR Sequences, 2014 Second International Conference on 3D Vision, pp. 673-680 (Year: 2014).*
(Continued)

*Primary Examiner* — Nancy Bitar
*Assistant Examiner* — Xiao Liu
(74) *Attorney, Agent, or Firm* — Sughrue Mion, PLLC

(57) ABSTRACT

A point group data processing device includes: an image data acquisition unit configured to acquire a captured image; a point group data acquisition unit configured to acquire point group data indicating position information of a point group corresponding to a plurality of points included in the image; an area setting unit configured to set a target area which is an area surrounding a subject on the image and an enlargement area which is an area obtained by enlarging the target area; and a target point group specifying unit configured to specify a target point group corresponding to the
(Continued)

subject based on depth information of a point group included in the target area and depth information of a point group included in the enlargement area, which are included in the point group data.

6 Claims, 4 Drawing Sheets

(51) Int. Cl.
    *G06T 7/521*    (2017.01)
    *G06T 7/73*    (2017.01)
    *B60W 40/04*    (2006.01)
    *G01S 7/48*    (2006.01)
    *G01S 17/42*    (2006.01)
    *G01S 17/89*    (2020.01)
    *G06K 9/62*    (2022.01)
    *G06V 10/26*    (2022.01)
    *G06V 10/75*    (2022.01)
    *G06V 20/59*    (2022.01)

(52) U.S. Cl.
CPC ............ *G01S 17/89* (2013.01); *G06K 9/6267* (2013.01); *G06T 7/521* (2017.01); *G06T 7/73* (2017.01); *G06V 10/26* (2022.01); *G06V 10/758* (2022.01); *G06V 20/59* (2022.01); *B60W 2420/42* (2013.01); *G06T 2207/10028* (2013.01); *G06T 2207/30252* (2013.01); *G06V 2201/07* (2022.01)

(58) Field of Classification Search
CPC . B60W 2420/42; G06K 9/00832; G06K 9/34; G06K 9/6212; G06K 9/6267; G06K 2209/21; G06K 9/00791; G06T 7/521; G06T 7/73; G06T 2207/10028; G06T 2207/30252; G06T 7/11
See application file for complete search history.

(56) References Cited

FOREIGN PATENT DOCUMENTS

JP     2007255978 A  * 10/2007
JP     2016-134090 A    7/2016

OTHER PUBLICATIONS

Sener et al, Error-tolerant interactive image segmentation using dynamic and iterated graph-cuts, IMMPD'12: Proceedings of the 2nd ACM international workshop on Interactive multimedia on mobile and portable devices, Nov. 2012, pp. 9-16 (Year: 2012).*
Graph cuts in computer vision—Wikipedia (Year: 2022).*

* cited by examiner

THIS PORTION OF HISTOGRAM IS EXPANDED

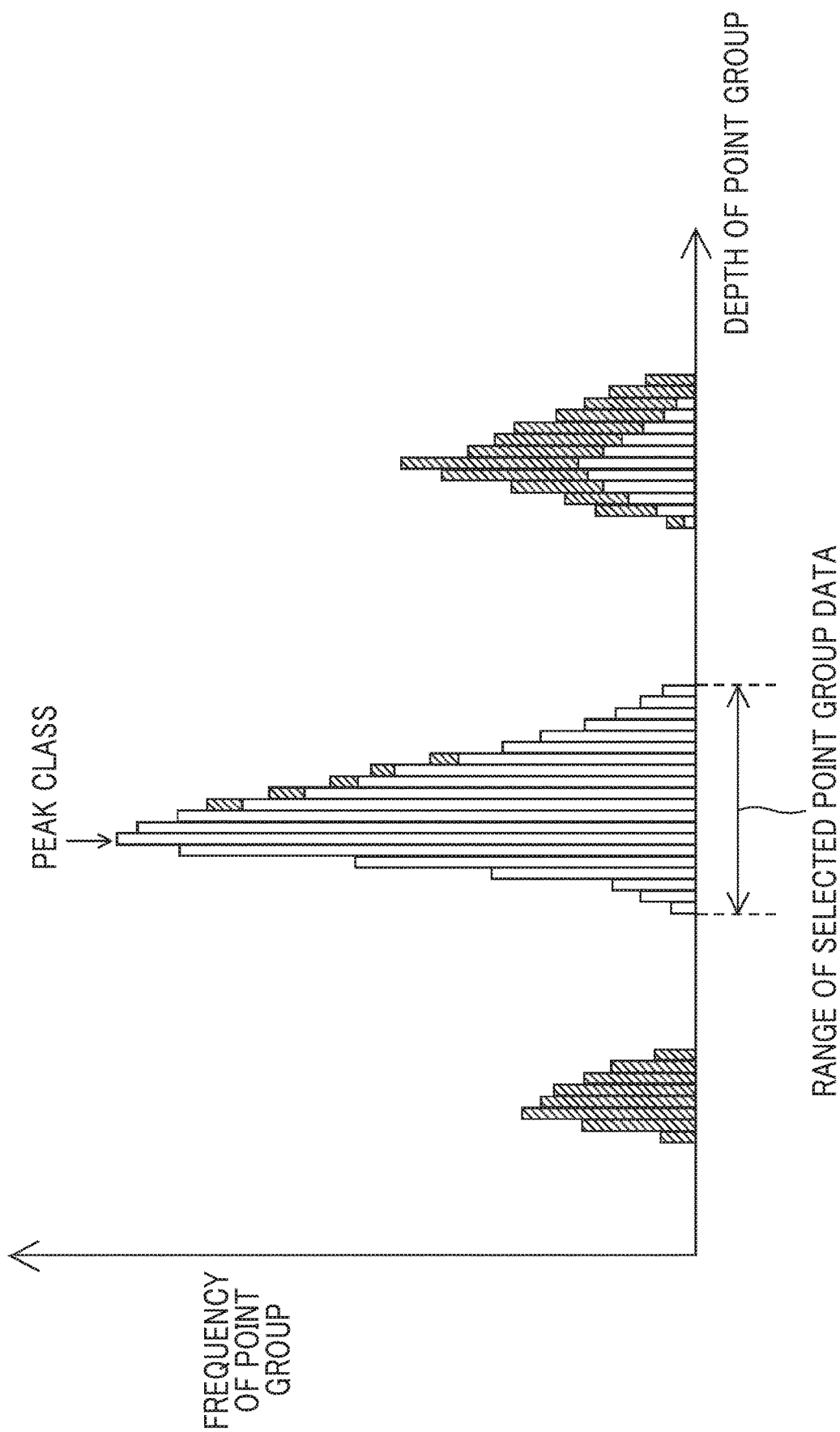

POINT GROUP DATA PROCESSING DEVICE, POINT GROUP DATA PROCESSING METHOD, POINT GROUP DATA PROCESSING PROGRAM, VEHICLE CONTROL DEVICE, AND VEHICLE

This application is a National Stage Entry of PCT/JP2018/005251 filed on Feb. 15, 2018, which claims priority from Japanese Patent Application 2017-025742 filed on Feb. 15, 2017, the contents of all of which are incorporated herein by reference, in their entirety.

TECHNICAL FIELD

The present invention relates to a technique for extracting solely point group data related to a subject among pieces of point group data acquired by a distance measurement device.

BACKGROUND ART

In the related art, there is a distance measurement technique referred to as "light detection and ranging" or "laser Imaging detection and ranging" (Lidar). With the Lidar, a method is developed in which point group data acquiring a distance to a measurement point and three-dimensional coordinates of the measurement point for many measurement points is obtained and a distance to a subject, a shape of the subject, or the like is specified based on the point group data.

PTL 1 discloses an image processing device that predicts contact between a moving body and an obstacle using point group data and a driving assistance system using the point group data.

CITATION LIST

Patent Literature

PTL 1: Japanese Unexamined Patent Application Publication No. 2016-134090 (JP 2016-134090 A)

SUMMARY OF THE INVENTION

For point group data acquired by Lidar or the like, a wide range is uniformly searched to acquire the data. Therefore, in order to use the acquired point group data according to an object, it is needed to perform classification such as whether the acquired point group data is included in a subject, so-called segmentation of point group data.

Examples of a method of the segmentation of point group data include the followings.

(1) Simple Euclidean Distance Based Segmentation

It is a method of calculating by regarding a cluster equal to or less than a threshold value as a segment based on a distance between point groups. For example, a method is commonly used in which rough segmentation is first performed with depth information and distance based segmentation is adapted to the rough segmentation to obtain fine segmentation.

(2) Difference of Normals (DoN)

DoN is known as a devised method. This calculates a normal vector A in a fixed certain range with one point in a point group as the center. Furthermore, a normal vector B in a wider range than when A is calculated is calculated. At that time, it can be regarded that a shape change around a target point is larger as an absolute value |B−A| when a difference between the vectors A, B is calculated is larger and the change around the target point is smaller as the absolute value is smaller. It can be expected that clusters belonging to each object are effectively separated by filtering a point other than a point where the change is large.

(3) Min-Cut Based Segmentation

It is a method of recursively dividing a point group using the minimum cut algorithm which is a standard method of graph theory by regarding the point group as a graph.

In the method of (1), the classification may not be performed appropriately since an optimal threshold value may differ depending on an object to be segmented. In addition, there is a problem that the distance based method cannot distinguish when objects are very close to each other. In the method (2), there is a problem that a calculation amount becomes enormous when a point group of Lidar that can cover a wide range is dealt with since the normal vector is requested to be calculated for each point. In addition, there is a problem that it is difficult to distinguish an adjacent object since the post-filtering processing performs distance based clustering. In the method (3), there is a problem that the calculation amount becomes enormous similar to (2) and there is a processing problem that a threshold value for dividing the point group finely is requested to be decided.

In a technique such as autonomous driving, in order to identify a vehicle traveling ahead or an obstacle and perform processing in real time, pieces of point group data need to be accurately classified for each subject and the classification needs to be performed in a short time with a small calculation amount for performing the classification in real time. However, the above methods (1) to (3) do not satisfy this condition.

The invention is made in view of the above problems, and an object of the invention is to provide a point group data processing device, a point group data processing method, a point group data processing program, a vehicle control device, and a vehicle capable of accurately classifying pieces of point group data for each subject with a calculation amount that can be processed in a short time.

A point group data processing device according to the invention includes an image data acquisition unit configured to acquire a captured image, a point group data acquisition unit configured to acquire point group data indicating position information of a point group corresponding to a plurality of points included in the image, an area setting unit configured to set a target area which is an area surrounding a subject on the image and an enlargement area which is an area obtained by enlarging the target area, and a target point group specifying unit configured to specify a target point group corresponding to the subject based on depth information of a point group included in the target area and depth information of a point group included in the enlargement area, which are included in the point group data.

In the point group data processing device according to the invention, the target point group specifying unit compares a histogram of a target area created from the depth information of the point group included in the target area and a histogram of an enlargement area created from the depth information of the point group included in the enlargement area so as to specify a range where both histograms match as a target point group corresponding to a subject.

In the point group data processing device according to the invention, the target point group specifying unit compares the histogram value of the target area and the histogram value of the enlargement area for each class from a peak class of a distribution in the histogram of the target area respectively toward a deep direction and a shallow direction in depth of the point group and sets the last class in which a difference between both histogram values is equal to or less than a predetermined value and the histogram value of the enlargement area is equal to or larger than a predetermined value as a boundary class included in the range of the histogram to be specified as the target point group.

A point group data processing method according to the invention includes an image data acquisition step of acquiring a captured image, a point group data acquisition step of acquiring point group data indicating position information of a point group corresponding to a plurality of points included in the image, an area setting step of setting a target area which is an area surrounding a subject on the image and an enlargement area which is an area obtained by enlarging the target area, and a target point group specifying step of specifying a target point group corresponding to the subject based on depth information of a point group included in the target area and depth information of a point group included in the enlargement area, which are included in the point group data.

A point group data processing program according to the invention causing a computer to execute an image data acquisition function of acquiring a captured image, a point group data acquisition function of acquiring point group data indicating position information of a point group corresponding to a plurality of points included in the image, an area setting function of setting a target area which is an area surrounding a subject on the image and an enlargement area which is an area obtained by enlarging the target area, and a target point group specifying function of specifying a target point group corresponding to the subject based on depth information of a point group included in the target area and depth information of a point group included in the enlargement area, which are included in the point group data.

A vehicle control device according to the invention includes the point group data processing device.

A vehicle according to the invention includes the vehicle control device.

According to the invention, it is possible to correctly distinguish the point group belonging to the adjacent object as long as the target area is correctly set based on an object detection algorithm or the like for the image data. When the point group is projected to a place where a plurality of target areas overlaps, it is impossible to distinguish which point group data belongs to which box just by projecting the three-dimensional point group data onto the two-dimensional image data since there is no depth information in the two-dimensional image data. However, with the point group data processing device 10 according to the invention, it is possible to accurately specify the point group data corresponding to each box with a small calculation amount. That is, since class/tracking information of an object obtained by object recognition of a camera image can be used as it is, there is an advantage that there is no need to separately prepare a classifier/tracker for the point group.

BRIEF DESCRIPTION OF THE DRAWINGS

FIG. 6 is an image diagram representing an example of a distribution of a histogram.

MODES FOR CARRYING OUT THE INVENTION

First Embodiment

Figure 1:
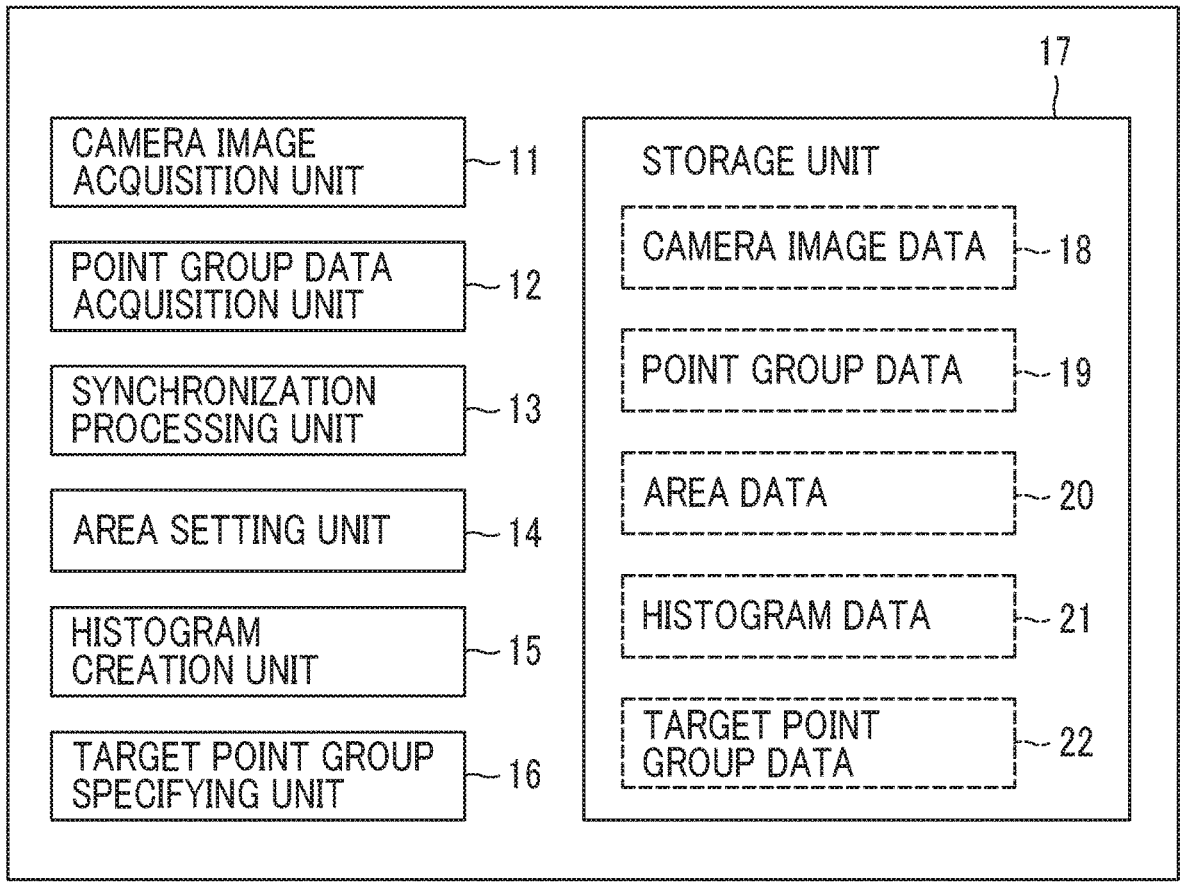
FIG. 1 is a block diagram representing a configuration of a point group data processing device 10 for disease according to the invention.

Hereinafter, an example of a point group data processing device according to a first embodiment will be described with reference to drawings. FIG. 1 is a block diagram representing a configuration of a point group data processing device 10 according to the invention. The point group data processing device 10 may be a device designed as a dedicated machine but is assumed to be realized by a general computer. In this case, the point group data processing device 10 is assumed to include a central processing unit (CPU), a memory, and a storage such as a hard disk drive which may normally be included in a general computer. The device is assumed to further include a graphics processing unit (GPU) as needed (not shown). It is needless to say that various pieces of processing are executed by a program in order to cause these general computers to function as the point group data processing device 10 of the example.

The point group data processing device 10 includes at least a camera image acquisition unit 11, a point group data acquisition unit 12, a synchronization processing unit 13, an area setting unit 14, a histogram creation unit 15, a target point group specifying unit 16, and a storage unit 17.

The camera image acquisition unit 11 has a function of acquiring a camera image from an imaging camera separately provided to image an environment to be processed by the point group data processing device 10. For example, when the point group data processing device 10 is mounted on a vehicle, the imaging camera is installed so as to image the front of the vehicle to acquire a camera image, and camera image data 18 from the imaging camera is acquired by the camera image acquisition unit 11.

The point group data acquisition unit 12 has a function of acquiring point group data from a distance measurement device separately provided for acquiring the point group data composed of a distance (depth) to each point of a target and three-dimensional coordinate information in the environment to be processed by the point group data processing device 10. For example, when the point group data processing device 10 is mounted on a vehicle, the distance measurement device is installed to acquire point group data in the front direction of the vehicle, and the point group data from the distance measurement device is acquired by the point group data acquisition unit 12. An installation position of the distance measurement device is preferably close to the imaging camera for acquiring the camera image data 18, and the ideal is that measurement can be performed in the same direction and at the same angle as an imaging direction of the camera. An example of the distance measurement device includes the Lidar but is not limited thereto. Anything may be employed as long as the distance (depth) to each point and the three-dimensional coordinate information can be obtained.

The synchronization processing unit 13 has a function of performing synchronization processing and calibration between the camera image data 18 acquired by the camera image acquisition unit 11 and point group data 19 acquired by the point group data acquisition unit 12. For example, when the point group data processing device 10 is mounted on a vehicle, the acquisition of the image data 18 by the imaging camera and the acquisition of the point group data 19 by the distance measurement device are simultaneously performed. However, these pieces of data need to be synchronized with each other in the point group data processing device 10. The point group data by the distance measurement device is the three-dimensional coordinate information while the camera image data by the imaging camera is a two-dimensional flat image. Therefore, in order to appropriately project the point group data onto the camera image data, the calibration needs to be performed between the imaging camera and the distance measurement device.

The area setting unit 14 has a function of setting a target area including a subject included in the camera image and an enlargement area obtained by enlarging the target area based on the camera image data 18 acquired by the camera image acquisition unit 11. Any method may be employed to specify the subject included in the camera image and set the target area, and the target area is set based on an existing object detection algorithm. The enlargement area is an area obtained by enlarging the target area at a predetermined magnification and is set in a state of always including the target area. When there is a plurality of subjects in the camera image, the target area and the enlargement area are set for each subject. When the subjects overlap, the target area and the enlargement area are also in an overlapped state, but there is no change in that the areas are set for each subject. The target area and the enlargement area are set from the camera image data 18 in this example but may be set from the point group data 19.

The histogram creation unit 15 has a function of creating a histogram based on depth information of point group data to be projected onto the target area and the enlargement area set by the area setting unit 14 among pieces of the point group data 19. Specifically, subsets p, p' of the point group data to be projected respectively onto a target area b and an enlargement area b' are obtained for each of a plurality of target areas in an image to create histograms h, h' from pieces of depth information of p, p'. When a portion of the target area is overlapped between the target areas, point group data included in a front target area is excluded from a histogram of a target area being processed.

The target point group specifying unit 16 has a function of comparing the histogram of the target area created with the histogram of the enlargement area by the histogram creation unit 15 to specify a point group in a range where distributions approximately match as the point group data of the subject. The point group data corresponding to the subject is specified to obtain the target point group data based on an idea that when a non-target object appearing in the target area is assumed to extend outside the target area, the distribution of the histogram corresponding to a distance of the non-target object increases when a range of the histogram is expanded to the enlargement area whereas the distribution of the histogram corresponding to an original subject does not change even when the range of the histogram is expanded to the enlargement area.

The storage unit 17 has a function of storing data used in the point group data processing device 10 and data obtained as a processing result. Specifically, camera image data 18, point group data 19, area data (data of target area and enlargement area) 20, histogram data 21, target point group data 22, and the like are stored as shown in FIG. 1.

Figure 2:
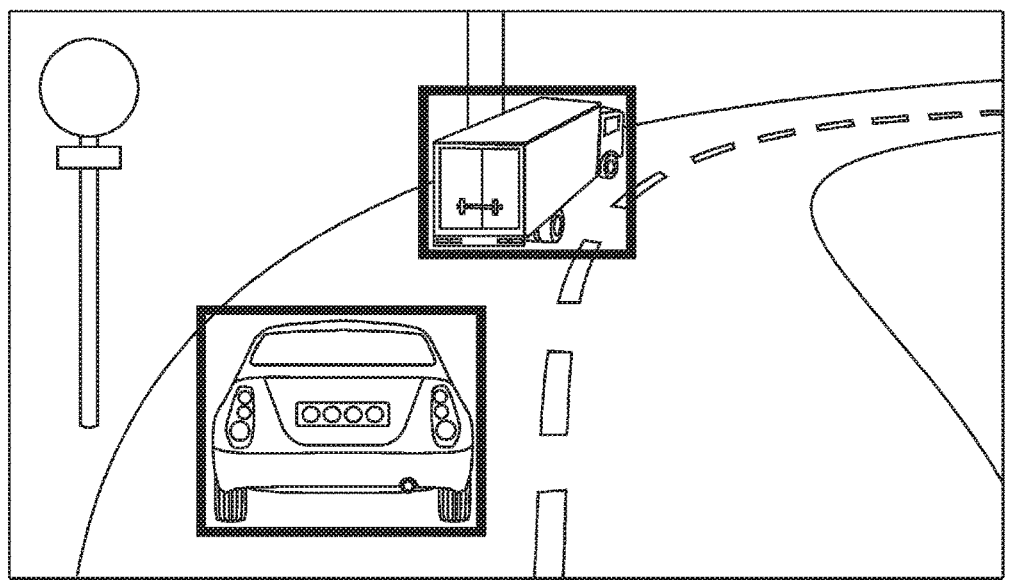
FIG. 2 is an explanatory view of representing a state where target areas are set for camera image data.

Next, an outline of processing in the point group data processing device 10 according to the invention will be described based on the drawings. FIG. 2 is an explanatory view of a state where target areas are set for camera image data. FIG. 2 represents the case where the point group data processing device 10 is mounted on a vehicle and the front of the vehicle is imaged to acquire the camera image data. In the area setting unit 14, processing of setting a target area on the image data is performed based on the existing object detection algorithm to detect other vehicles traveling ahead as a subject and set a rectangular target area (hereinafter also referred to as box) surrounding each vehicle as shown in FIG. 2. In FIG. 2, another subject is not included in the target area of a vehicle one before, but a utility pole existing in the back of a vehicle is included in the target area of the vehicle two before.

Figure 3:
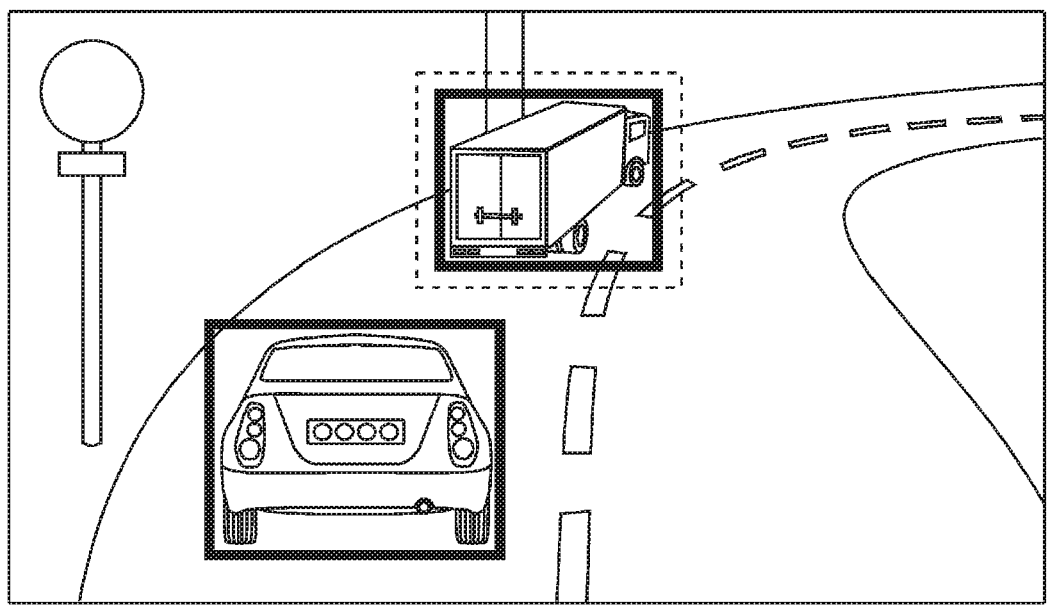
FIG. 3 is an explanatory view of representing a state where an enlargement area is set for the camera image data.
Figure 4:
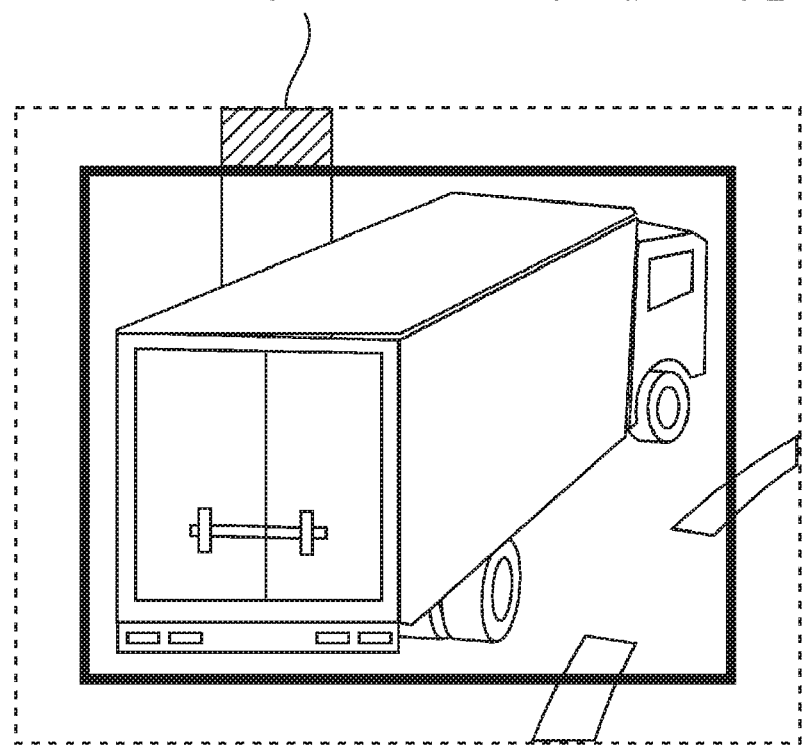
FIG. 4 is an explanatory view in which one enlargement area in FIG. 3 is displayed.

FIG. 3 is an explanatory view of a state where an enlargement area is set for the camera image data. FIG. 3 represents a state where the enlargement area obtained by enlarging the target area set in FIG. 2 is set. In FIG. 3, since another subject is not included in the target area of the vehicle one before, the area including another subject does not increase even when the range of the histogram is expanded to the enlargement area. However, since the utility pole existing in the back of the vehicle is included in the target area of the vehicle two before, the area including the utility pole increases when the range of the histogram is expanded to the enlargement area. FIG. 4 is an explanatory view in which one enlargement area in FIG. 3 is enlarged. As shown in FIG. 4, since the area including the utility pole increases when the range of the histogram is expanded to the enlargement area, the distribution of the histogram corresponding to the distance of the utility pole increases. That is, there is no change in the distribution of the histogram of the original subject between the target area and the enlargement area. However, when another subject is partially included in the target area, the distribution of the histogram increases when the range of the histogram is expanded to the enlargement area. Using this, solely the point group data representing the subject is specified by the target point group specifying unit 16.

Figure 5:
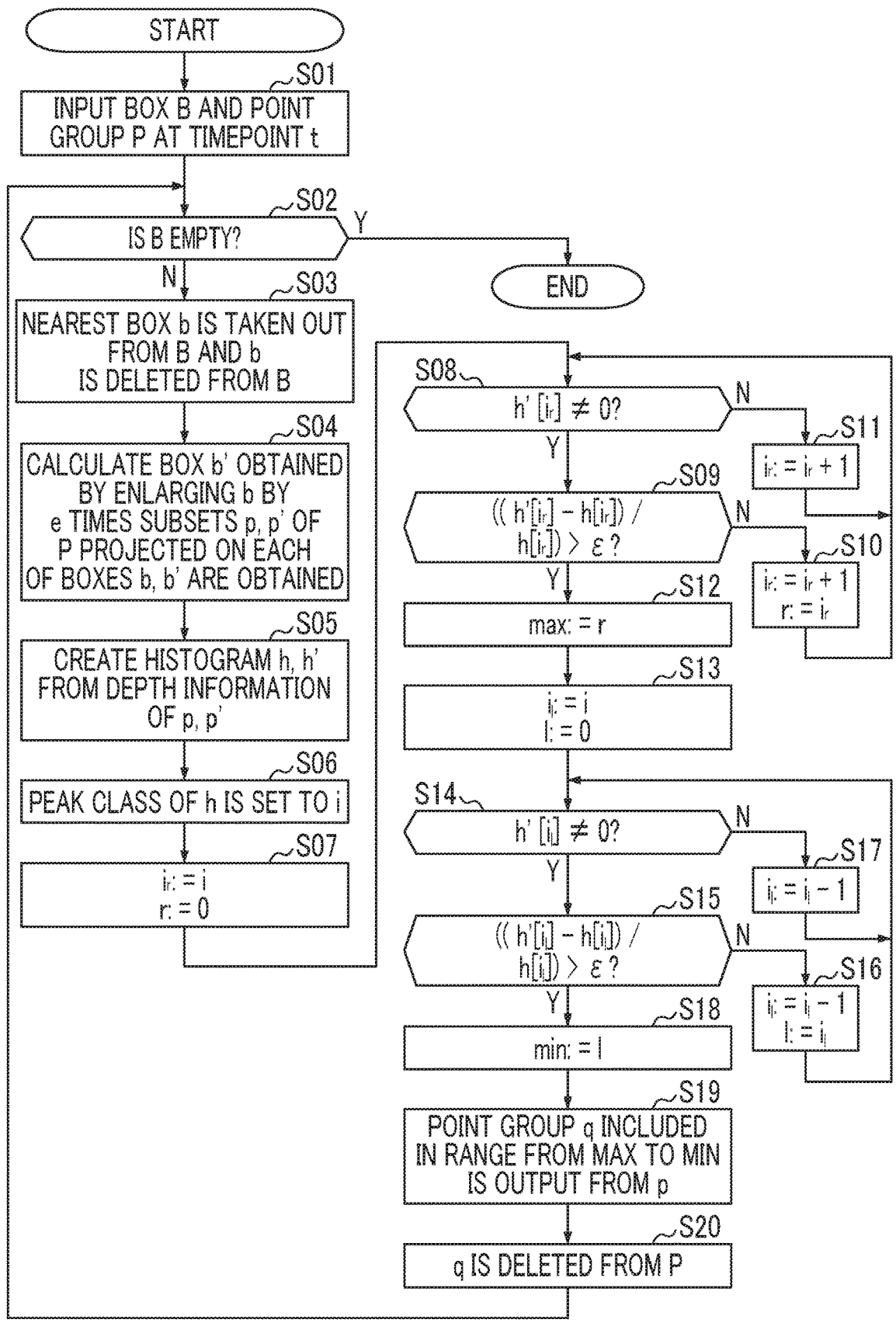
FIG. 5 is a flowchart diagram representing a flow of target point group specifying processing in the point group data processing device 10.

Next, a flow of target point group specifying processing in the point group data processing device 10 according to the invention will be described based on the drawings. FIG. 5 is a flowchart diagram representing the flow of the target point group specifying processing in the point group data processing device 10. The target point group specifying processing in FIG. 5 is started from a time when the target area (box) is set in image data at timepoint t. When the image data is acquired as a video by the imaging camera, it is assumed that an image is selected in units of frames and processing is performed on the image. In the following description, a box B is assumed to be a concept including all boxes set for each subject included in an image, and a point group P is assumed to be a concept including all pieces of point group data corresponding to image data.

In FIG. 5, the target point group specifying processing is started by acquiring the box B and the point group P at timepoint t (step S01). For the box B at timepoint t, determination is made whether the B is empty (step S02). When the B is empty, that is, there is no more target area requested to be processed in the box B at timepoint t, the flow of the target point group specifying processing ends. When the B is not empty, the nearest box b is taken out and the b is deleted from the B (step S03).

Next, a box b' corresponding to an enlargement area obtained by enlarging the taken out box b by e times (e is a predetermined value of one or more) is calculated, and the subsets p, p' of the point group P projected on each of the boxes b, b' are obtained (step S04). For each of the subsets p, p', the histograms h, h' are created from the depth information (step S05). A peak class of the histogram h is set to i (step S06). Since a peak class portion with the most concentrated distribution in the histogram corresponds to the distance of the subject when the subject is properly included in the box b, a portion including the peak class i is assumed to be a range of the target point group. Next, it is needed to decide how far the range of the target point group is in a deep direction in depth in the histogram and how far the range of the target point group is in a shallow direction in depth in the histogram.

A first class $i_r$ of a histogram to be searched is defined as i ($i_r$: =i), and r representing the deepest class in depth in the range of the target point group is defined as zero (r: =0) (step S07). Determination is made whether $h'[i_r]$ which is a histogram value of the class $i_r$ in the histogram h' of the enlargement area b' is not zero ($h'[i_r] \neq 0$) (step S08). When $h'[i_r] \neq 0$, next, determination is made whether $((h'[i_r]-h[i_r])/h[i_r]) > \varepsilon$ (step S09). This is an equation for determining whether a difference between the histogram values $h[i_r]$, $h'[i_r]$ in the boxes b, b' in the class $i_r$ is equal to or larger than a predetermined value. A value of $((h'[i_r]-h[i_r])/h[i_r])$ becomes a value close to zero and thus becomes equal to or less than the threshold value c when both histogram values have substantially the same value, but the value of $((h'[i_r]-h[i_r])/h[i_r])$ exceeds the threshold value c when both values have a certain difference or more. Since the value of $((h'[i_r]-h[i_r])/h[i_r])$ becomes the value close to zero when the first class is in the range of the target point group, the determination result is No in step S09 and the processing shifts to step S10. In order to shift to a next class search, $i_r$: =$i_r$+1 and r:=$i_r$ are set and then the processing returns to step S08 (step S10).

Here, FIG. 6 is an image diagram representing an example of the distribution of the histogram. In FIG. 6, the horizontal axis is the depth (distance) from the distance measurement device to a target point, and the vertical axis is a frequency of the point group. A white bar graph is the distribution of the histogram h corresponding to the box b in the target area, and a hatched bar graph is the distribution of the histogram h' corresponding to the box b' in the enlargement area. When both graphs are displayed in a superimposed manner, solely an increased portion in the histogram h' of the enlargement area portion is displayed as the hatched bar graph. In FIG. 6, when the search is started from the peak class i, the class to be searched is moved in the deep direction in depth (right (r) direction in FIG. 6). Since the determination result is No in step 09 of FIG. 5 when both h and h' match or when there is a difference but the difference is slight, the search target is changed to a next class (return to step S08) while r representing the deepest class in depth in the range of the target point group is updated to a value of a class currently searched for (step S10). When the processing is repeated, a class in which the value of $h'[i_r]$ becomes zero is reached as shown in FIG. 6. In this case, since the determination result is No in step S08, the processing shifts to step S11. The class to be searched is changed to the next class as $i_r$:=$i_r$+1 but r representing the deepest class in depth in the range of the target point group is not changed, and the processing shifts to the next class (step S11). When the class in which the value of $h'[i_r]$ is zero continues, the shifting to the next class continues with no change in r (loop of S08 and S11). When the value of $h'[i_r]$ reaches a non-zero class (Yes in step S08), the determination is made whether $((h'[i_r]-h[i_r])/h[i_r]) > \varepsilon$ in the class (step S09). Here, when both values of $h'[i_r]$, $h[i_r]$ have a certain difference or more, the processing shifts to next step S12 since the value of $((h'[i_r]-h[i_r])/h[i_r])$ exceeds the threshold value c (Yes in step S09). In order to confirm r representing the deepest class in depth in the range of the target point group, max: =r is defined (step S12).

Next, a first class $i_l$ of a histogram to be searched in the processing of deciding how far the range of the target point group is in the shallow direction in depth in the histogram is defined as i ($i_l$:=i), and l representing the shallowest class in depth in the range of the target point group is defined as zero (l:=0) (step S13). Determination is made whether $h'[i_l]$ which is a histogram value of the class $i_l$ in the histogram h' of the enlargement area b' is not zero ($h'[i_l] \neq 0$) (step S14). When $h'[i_l] \neq 0$, next, determination is made whether $((h'[i_l]-h[i_l])/h[i_l]) > \varepsilon$ (step S15). This is an equation for determining whether a difference between the histogram values $h[i_l]$, $h'[i_l]$ in the boxes b, b' in the class $i_l$ is equal to or larger than a predetermined value. A value of $((h'[i_l]-h[i_l])/h[i_l])$ becomes a value close to zero and thus becomes equal to or less than the threshold value c when both histogram values have substantially the same value, but the value of $((h'[i_l]-h[i_l])/h[i_l])$ exceeds the threshold value $\varepsilon$ when both values have a certain difference or more. Since the value of $((h'[i_l]-h[i_l])/h[i_l])$ becomes the value close to zero when the first class is in the range of the target point group, the determination result is No in step S15 and the processing shifts to step S16. In order to shift to a next class search, $i_l$:=$i_l$+1 and l:=$i_l$ are set and then the processing returns to step S14 (step S16).

The search is started from the peak class i and the class to be searched is moved in the shallow direction in depth (left (l) direction in FIG. 6). Since the determination result is No in step 15 of FIG. 5 when both h and h' match or when there is a difference but the difference is slight, the search target is changed to a next class (return to step S14) while l representing the shallowest class in depth in the range of the target point group is updated to a value of a class currently searched for (step S16). When the processing is repeated, a class in which the value of $h'[i_l]$ becomes zero is reached as shown in FIG. 6. In this case, since the determination result is No in step S14, the processing shifts to step S17. The class to be searched is changed to the next class as $i_l$:=$i_l$+1 but l representing the deepest class in depth in the range of the target point group is not changed, and the processing shifts to the next class (step S17). When the class in which the value of $h'[i_l]$ is zero continues, the shifting to the next class continues with no change in l (loop of S14 and S17). When the value of $h'[i_l]$ reaches a non-zero class (Yes in step S14), the determination is made whether $((h'[i_l]-h[i_l])/h[i_l]) > \varepsilon$ in the class (step S15). Here, when both values of $h'[i_l]$, $h[i_l]$ have a certain difference or more, the processing shifts to next step S18 since the value of $((h'[i_l]-h[i_l])/h[i_l])$ exceeds the threshold value c (Yes in step S15). In order to confirm l representing the shallowest class in depth in the range of the target point group, min:=l is defined (step S18).

In this manner, the deepest class in depth max and the shallowest class in depth min are confirmed for the histogram range of the target point group. Therefore, a range from max to min is specified as target point group data q of b and the target point group data q is output (step S19). The q is deleted from the point group P corresponding to the entire image data, and the processing shifts to step S02 (step S20). Steps S02 to S20 are repeated as long as there is a box in the image data, and the processing ends when there is no unprocessed box in the box B.

In steps S08, S14, the confirmation is made whether the histogram value of the enlargement area is zero, but zero as the comparison target is an example. In the invention, the same effect can be obtained by a step of confirming whether the histogram value of the enlargement area is equal to or more than a predetermined value. The same effect cannot be obtained when the predetermined value is set extremely large. It is preferable to adjust the value at the time of design as appropriate and set the value to a predetermined value other than zero within a range where the effect of the invention can be obtained.

The range of the point group data of the subject can be selected from the distribution of the histogram composed of all pieces of point group data in the box as shown in FIG. 6 by performing the above target point group specifying processing. Therefore, solely the point group data of the subject is specified and thus unneeded point group data can be deleted and the data amount to be handled can be reduced.

As described above, with the point group data processing device 10 according to the invention, it is possible to correctly distinguish the point group belonging to the adjacent object as long as a box is correctly attached to the image data based on the object detection algorithm or the like. When the point group is projected to a place where a plurality of boxes overlaps, it is impossible to distinguish which point group data belongs to which box just by projecting the three-dimensional point group data onto the two-dimensional image data since there is no depth information in the two-dimensional image data. However, with the point group data processing device 10 according to the invention, it is possible to accurately specify the point group data corresponding to each box with a small calculation amount. That is, since class/tracking information of an object obtained by object recognition of a camera image can be used as it is, there is an advantage that there is no need to separately prepare a classifier/tracker for the point group.

With the point group data processing device 10 according to the invention, since it is possible to create a large amount of correct data for point group segmentation, there is an effect that training data for machine learning algorithm can be easily prepared. It is possible to perform performance evaluation of autonomous driving software and parameter tuning using data generated in this manner.

The invention can be adapted to three-dimensional space information automatic generation tool such as creation of three-dimensional map information since depth information obtained from a point group can be provided to an object appearing in a two-dimensional image, in addition to the case where the invention is adapted to the driving assistance system such as the autonomous driving.

REFERENCE SIGNS LIST

10 . . . POINT GROUP DATA PROCESSING DEVICE, 11 . . . CAMERA IMAGE ACQUISITION UNIT, 12 . . . POINT GROUP DATA ACQUISITION UNIT, 13 . . . SYNCHRONIZATION PROCESSING UNIT, 14 . . . AREA SETTING UNIT, 15 . . . HISTOGRAM CREATION UNIT, 16 . . . TARGET POINT GROUP SPECIFYING UNIT, 17 . . . STORAGE UNIT, 18 . . . CAMERA IMAGE DATA, 19 . . . POINT GROUP DATA, 20 . . . AREA DATA, 21 . . . HISTOGRAM DATA, 22 . . . TARGET POINT GROUP DATA

The invention claimed is:

1. A point group data processing device, the device comprising one or more processors configured to:
acquire a captured image;
acquire point group data indicating position information of a point group corresponding to a plurality of points included in the image;
set a target area which is an area surrounding a subject on the image and set an enlargement area which is an area obtained by enlarging the target area to include an area surrounding the target area; and
specify a target point group corresponding to the subject based on depth information of a point group included in the target area and depth information of a point group included in the enlargement area, which are included in the point group data, wherein the specifying the target point group corresponding to the subject comprises comparing a histogram of a target area created from the depth information of the point group included in the target area and a histogram of an enlargement area created from the depth information of the point group included in the enlargement area so as to specify a range where both histograms match as the target point group corresponding to the subject.

2. The point group data processing device according to claim 1, wherein the specifying the target point group corresponding to the subject comprises comparing the histogram value of the target area and the histogram value of the enlargement area for each class from a peak class of a distribution in the histogram of the target area respectively toward a deep direction and a shallow direction in depth of the point group and sets the last class in which a difference between both histogram values is equal to or less than a predetermined value and the histogram value of the enlargement area is equal to or larger than a predetermined value as a boundary class included in the range of the histogram to be specified as the target point group.

3. A vehicle control device comprising the point group data processing device according to claim 1.

4. A vehicle comprising the vehicle control device according to claim 3.

5. A point group data processing method, executed by one or more processors, comprising:
acquiring a captured image;
acquiring point group data indicating position information of a point group corresponding to a plurality of points included in the image;
setting a target area which is an area surrounding a subject on the image and setting an enlargement area which is an area obtained by enlarging the target area to include an area surrounding the target area; and
specifying a target point group corresponding to the subject based on depth information of a point group included in the target area and depth information of a point group included in the enlargement area, which are included in the point group data, wherein the specifying the target point group corresponding to the subject comprises comparing a histogram of a target area created from the depth information of the point group included in the target area and a histogram of an enlargement area created from the depth information of the point group included in the enlargement area so as to specify a range where both histograms match as the target point group corresponding to the subject.

6. A non-transitory computer readable medium storing a point group data processing program, the point group data processing program causing a computer to execute a process, the process comprising:

acquiring a captured image, acquiring point group data indicating position information of a point group corresponding to a plurality of points included in the image, setting a target area which is an area surrounding a subject on the image and setting an enlargement area which is an area obtained by enlarging the target area to include an area surrounding the target area, and specifying a target point group corresponding to the subject based on depth information of a point group included in the target area and depth information of a point group included in the enlargement area, which are included in the point group data, wherein the specifying the target point group corresponding to the subject comprises comparing a histogram of a target area created from the depth information of the point group included in the target area and a histogram of an enlargement area created from the depth information of the point group included in the enlargement area so as to specify a range where both histograms match as the target point group corresponding to the subject.

* * * * *